No. 858,525. PATENTED JULY 2, 1907.
E. METTLER.
BOILER TUBE CLEANER.
APPLICATION FILED JULY 16, 1906.

Witnesses
Frank A. Fahle
Thomas W. McMeans

Inventor
Eugene Mettler
BY
Bradford & Hood
Attorneys

UNITED STATES PATENT OFFICE.

EUGENE METTLER, OF INDIANAPOLIS, INDIANA.

BOILER-TUBE CLEANER.

No. 858,525.      Specification of Letters Patent.      Patented July 2, 1907.

Application filed July 16, 1906. Serial No. 326,410.

To all whom it may concern:

Be it known that I, EUGENE METTLER, a citizen of the United States, residing at Indianapolis, in the county of Marion and State of Indiana, have invented certain new and useful Improvements in Boiler-Tube Cleaners, of which the following is a specification.

The object of my invention is to produce a tool for boring tubes, said tool being composed of a series of readily assembled parts which may be easily disassociated for purposes of replacement and which are held in place by a single readily removable retaining means.

The accompanying drawings illustrate my invention.

Figure 1:
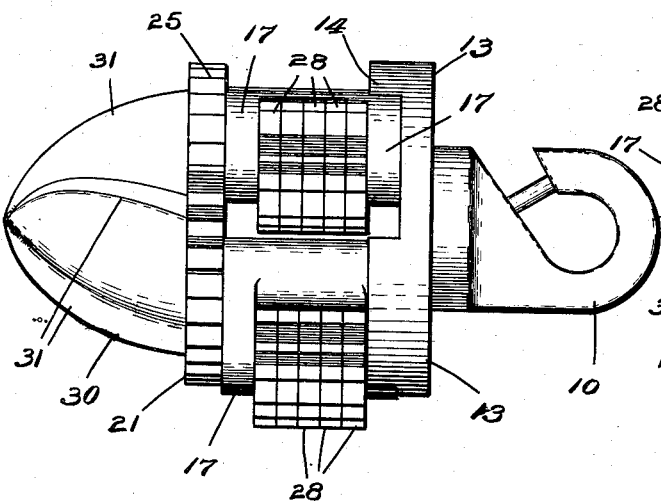
Figure 2:
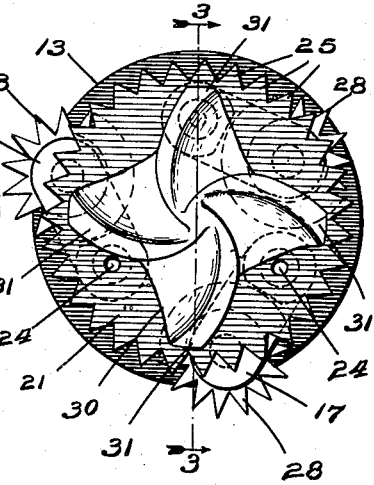
Figure 3:
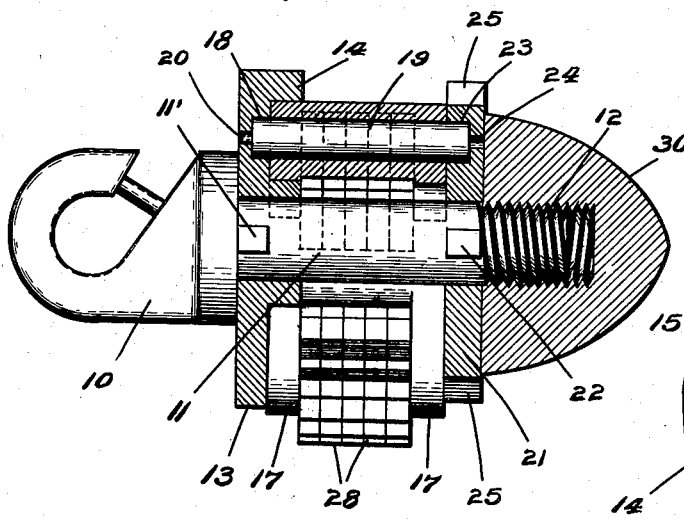
Figure 4:
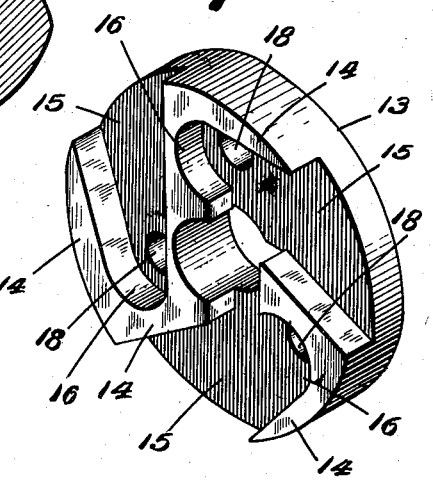
Figure 5:
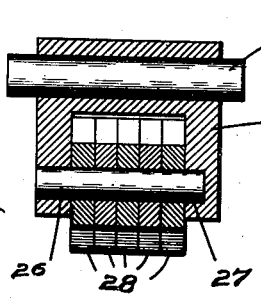

Figure 1 is a side elevation; Fig. 2 an elevation of the forward end; Fig. 3 a partial axial section on line 3—3 of Fig. 2; Fig. 4 a perspective detail of one of the heads, and Fig. 5 a sectional detail of one of the swinging bur-carrying arms.

In the drawings 10 indicates the usual hook-shaped member for connection with a suitable motor. The member 10 carries a spindle 11 which is threaded at its outer end 12. Fitting spindle 11, adjacent the portion 10 is a head 13 connected to the spindle 11, so as to rotate therewith, by means of a pin or lug 11'. Head 13 is provided upon its inner face with ribs or projections 14 forming V-shaped spaces 15 which, at their inner ends form sockets 16 for the reception of the inner ends of bur-carrying arms 17. In line with each socket 16 the inner face of head 13 is provided with a socket 18 adapted to receive one end of a pin 19 which is passed loosely through the inner end of each arm 17. The sockets 18 preferably do not extend entirely through head 13 although a smaller opening 20 may be formed from the bottom of each socket through the head in order to make it easy to keep the sockets clean. Coöperating with head 13 is a head 21 which is connected with spindle 11, for rotation therewith, by means of a lug 22. Head 21 is provided on its inner face with sockets 23 adapted to receive adjacent ends of pins 19 and said sockets do not extend entirely through the head although a smaller perforation 24 may be extended through the head if desired. Head 21 is provided on its circumference with teeth 25 adapted to engage the scale in a boiler tube.

Each bur-carrying arm 17 is bifurcated at its outer end and a pin 26 is passed loosely through one of its arms into a socket 27 formed in the inner face of the other arm. Rotatably mounted on the pin 26 is a series of burs 28 of any desired form.

All of the parts are held in position by means of a single nut 30 which is screwed upon the threaded end 12 of the spindle 11. The nut 30 is preferably coned and provided on its circumference with cutting teeth 31 and the direction of the threads forming the connection between the nut and the spindle 11 is such that the boring action tends to tighten the nut upon the spindle.

In assembling the parts the head 13 is first slipped upon the spindle 11 and the burs 28 are secured in their several arms 17 by slipping the pins 26 therethrough. The pins 19 are then slipped through the arms 17 each of which is then placed in one of the sockets 16 with its pin 19 in the alined socket 18, the pin 19 being held in axial displacement in one direction by the inner end of socket 18. The head 21 is then slipped upon the spindle and the several pins 19 introduced into the sockets 23 thus securing the pins 19 from axial displacement in the opposite direction and also guarding the exposed ends of the pins 26. The nut 30 is then screwed to position thus holding all of the parts against disassemblement. The bur-carrying arms 17 are free to swing through a limited arc between the two heads 13 and 21, the motion being limited, however, by the ribs 14, said ribs limiting both the inward and outward swing of the bur-carrying arms, in one direction preventing the burs from coming into engagement with the adjacent bur-carrying arm and in the other direction preventing the burs from swinging outward beyond a circle the diameter of which is equal to the internal diameter of boiler tube.

I claim as my invention.

1. In a boiler-tube cleaner, the combination, with a spindle, of a pair of heads detachably keyed thereto, each of said heads having upon its inner face a series of pin-receiving sockets, a series of bur-carrying arms arranged between said heads, pins lying between said heads in said sockets and passing through said bur-carrying arms, burs journaled in said bur-carrying arms, a nut threaded upon the outer end of the spindle and engaging the outer head to hold the several parts together, the inner face of one of said heads having recesses adapted to receive the adjacent ends of the bur-carrying arms to limit the swinging movement of the bur-carrying arms.

2. In a boiler-tube cleaner, the combination, with a spindle, of a pair of heads detachably keyed thereto, each of said heads having upon its inner face a series of pin-receiving sockets, a series of bur-carrying arms arranged between said heads, pins lying between said heads in said sockets and passing through said bur-carrying arms, burs journaled in said bur-carrying arms, a nut threaded upon the outer end of the spindle and engaging the outer head to hold the several parts together, the inner face of one of said heads having recesses adapted to receive the adjacent ends of the bur-carrying arms to limit the swinging movement of the bur-carrying arms, and boring cutters formed upon the outer surface of the nut.

3. In a boiler-tube cleaner, the combination, with a spindle, of a pair of heads carried thereby, the forward one of which is detachably connected to the spindle and provided on its circumference with cutting teeth, bur-carrying arms mounted between said heads and burs, carried by the outer ends of said bur-carrying arms.

4. In a boiler-tube cleaner, the combination, with a spindle, of a pair of heads carried thereby, the forward one of which is detachably connected to the spindle and provided on its circumference with cutting teeth, bur-carrying arms mounted between said heads and burs carried by the outer ends of said bur-carrying arms, means carried by the inner face of one of said heads for limiting ried by the outer ends of said bur-carrying arms.

5. In a boiler-tube cleaner, the combination, with a spindle, of a pair of heads carried thereby, the forward one of which is detachably connected to the spindle and provided on its circumference with cutting teeth, bur-carrying arms mounted between said heads and burs carried by the outer ends of said bur-carrying arms, and a drill-head nut clamping said detachable head upon the spindle and provided on its circumference with cutting means.

In witness whereof, I, have hereunto set my hand and seal at Indianapolis, Indiana, this 11th day of July, A. D. one thousand nine hundred and six.

EUGENE METTLER. [L. S.]

Witnesses:
ARTHUR M. HOOD,
THOMAS W. MCMEANS.